(12) United States Patent
Paulus

(10) Patent No.: US 12,509,863 B2
(45) Date of Patent: Dec. 30, 2025

(54) SYSTEM AND METHOD FOR LOCALIZING A WATER LEAK

(71) Applicant: THE DETECTION GROUP, INC., North Andover, MA (US)

(72) Inventor: Glen Paulus, La Mesa, CA (US)

(73) Assignee: THE DETECTION GROUP, INC., North Andover, MA (US)

( * ) Notice: Subject to any disclaimer, the term of this patent is extended or adjusted under 35 U.S.C. 154(b) by 313 days.

(21) Appl. No.: 18/476,471

(22) Filed: Sep. 28, 2023

(65) Prior Publication Data

US 2025/0109577 A1     Apr. 3, 2025

(51) Int. Cl.
  *E03B 7/00*    (2006.01)
  *E03B 7/07*    (2006.01)
  *G01M 3/28*    (2006.01)

(52) U.S. Cl.
  CPC .......... *E03B 7/003* (2013.01); *G01M 3/2807* (2013.01)

(58) Field of Classification Search
  CPC ...... E03B 7/003; E03B 7/071; G01M 3/2807; G01M 3/2815
  See application file for complete search history.

(56) References Cited

U.S. PATENT DOCUMENTS

| | | | |
|---|---|---|---|
| 3,978,709 A | 9/1976 | Ando | |
| 11,326,977 B2 | 5/2022 | Zheng et al. | |
| 11,591,777 B2 | 2/2023 | McConnell | |
| 2009/0235992 A1* | 9/2009 | Armstrong | G01M 3/2807 137/487.5 |
| 2016/0161940 A1* | 6/2016 | Max | F17D 5/00 700/282 |
| 2021/0140151 A1* | 5/2021 | Johnson | E03B 7/071 |
| 2022/0334023 A1* | 10/2022 | Paz | G01F 1/36 |

FOREIGN PATENT DOCUMENTS

WO     WO-9823936 A1 *    6/1998    .......... G01M 3/2807

OTHER PUBLICATIONS

US 3,702,074 A, 11/1972, Mullen (withdrawn)

* cited by examiner

*Primary Examiner* — Laura Martin
*Assistant Examiner* — Anthony W Megna Fuentes
(74) *Attorney, Agent, or Firm* — Nath, Goldberg & Meyer; Jerald L. Meyer; Morgan D. Rosenberg

(57) ABSTRACT

The system and method for localizing a water leak uses the automated opening and closing of shut-off valves to localize a water leak in a plumbing system. Water flow in the plumbing system is monitored with a flow meter as shut-off valves associated with a main line and a plurality of branch lines are successively opened and closed. When the continuous flow of water is detected following the opening of one of the shut-off valves, it can be determined that the water leak is in the line associated with that particular shut-off valve. Opening and closing of the shut-off valves, and monitoring with the flow meter, may be under the operation and control of a controller in communication with each. A similar technique may be used to determine if a water leak is in a hot water line or a cold water line of a plumbing system.

4 Claims, 9 Drawing Sheets

SYSTEM AND METHOD FOR LOCALIZING A WATER LEAK

BACKGROUND

Field

The disclosure of the present patent application relates to leak detection, and particularly to the localizing of a water leak in a plumbing system through the successive opening and closing of shut-off valves in the plumbing system.

Description of Related Art

Although a wide variety of devices and methods are used to detect leaks in plumbing systems and the like, the localization of a leak is typically performed using a large number of networked leak detectors distributed throughout the plumbing system, with the location of the leak being determined by which leak sensor(s) in the network detected the leak. In a typical house, office building or the like, where a plumbing system may include multiple sinks, multiple toilets, a hot water heater, and a variety of other appliances and water outlets, providing a separate leak sensor at each potential site of a leak can be not only cost prohibitive, but difficult to coordinate without a relatively powerful network server and a robust wired or wireless network connection. The cost and complexity increases with each additional leak detector in the network, thus, in order to reduce overall costs and complexity, it would be desirable to be able to localize leaks in a plumbing system with only a minimal number of detecting or monitoring devices. Thus, a system and method for localizing a water leak solving the aforementioned problems are desired.

SUMMARY

The system and method for localizing a water leak uses the automated opening and closing of shut-off valves to localize a water leak in a plumbing system. The plumbing system includes a main line and a plurality of branch lines in fluid communication therewith. Each of the branch lines terminates in a corresponding water outlet, such as a faucet, a spigot, a dispensing valve or the like. A flow meter is used to detect a leak in the plumbing system when each of the water outlets is in a non-dispensing state. As a non-limiting example, if each of the branch lines terminates in a water faucet, then when all of the water faucets are known to be turned off, if the flow meter detects water flow in the plumbing system, then a determination is made that a water leak exists.

Once the flow meter determines that the water leak exists, a main shut-off valve associated with the main line is closed, and a plurality of branch shut-off valves respectively associated with the plurality of branch lines are each closed. The main shut-off valve is then opened and, using the flow meter, it is determined if the water is continuously flowing through the main line. If water is determined to be flowing through the main line, then it can be determined that the leak in the plumbing system is in the main line. The main shut-off valve can then be closed again so that repairs can be implemented on the main line.

If the water is determined not to be continuously flowing through the main line, then each of the branch shut-off valves is successively opened. Following the opening of each of the branch shut-off valves, it is determined if the water is continuously flowing using the flow meter. When the flow meter determines that the water is continuously flowing directly after the opening of one of the branch shut-off valves, then it is determined that the leak in the plumbing system is in the particular branch line associated with that one of the branch shut-off valves. Directly following determination of the water leak in one of the branch lines, the branch shut-off valve associated with that branch line may be closed so that the opening and closing of subsequent ones of the branch shut-off valves can commence in order to detect any additional branch line leaks. The closing of that branch shut-off valve also allows that branch line to be inspected for implementation of repairs.

Opening and closing of the shut-off valves, and monitoring with the flow meter, may be under the operation and control of a controller in communication with each. Upon localization of the water leak, an indication may be provided to the user. As a non-limiting example, a display associated with the controller may give a textual, graphic or other visual indication to the user of the location of the water leak.

A similar technique may be used to determine if a water leak is in a hot water line or a cold water line of a plumbing system. In an alternative configuration, the plumbing system includes a cold main line with a plurality of cold branch lines in fluid communication with the cold main line, and a hot main line with a plurality of hot branch lines in fluid communication with the hot main line. The plumbing system further includes a plurality of water outlets, where each of the water outlets is in fluid communication with a corresponding one of the cold branch lines and also a corresponding one of the hot branch lines. As in the previous embodiment, the flow meter detects the leak in the plumbing system when each of the water outlets is in a non-dispensing state.

A hot main shut-off valve associated with the hot main line and a cold main shut-off valve associated with the cold main line are both closed. The hot main shut-off valve is then opened, and it is determined if water is continuously flowing through the hot main line using the flow meter. If water is determined to be flowing through the hot main line, then it is determined that the leak in the plumbing system is in the hot main line or in one of the hot branch lines in communication therewith.

If the water is determined not to be continuously flowing through the hot main line, then the hot main shut-off valve is closed and the cold main shut-off valve is opened. If the water is determined to be continuously flowing through the cold main line using the flow meter, then it is determined that the leak in the plumbing system is in the cold main line or in one of the cold branch lines in communication therewith. It should be understood that, alternatively, the cold main line may be tested first and that the above order of testing is provided as a non-limiting example only.

These and other features of the present subject matter will become readily apparent upon further review of the following specification.

DETAILED DESCRIPTION

Figure 1:
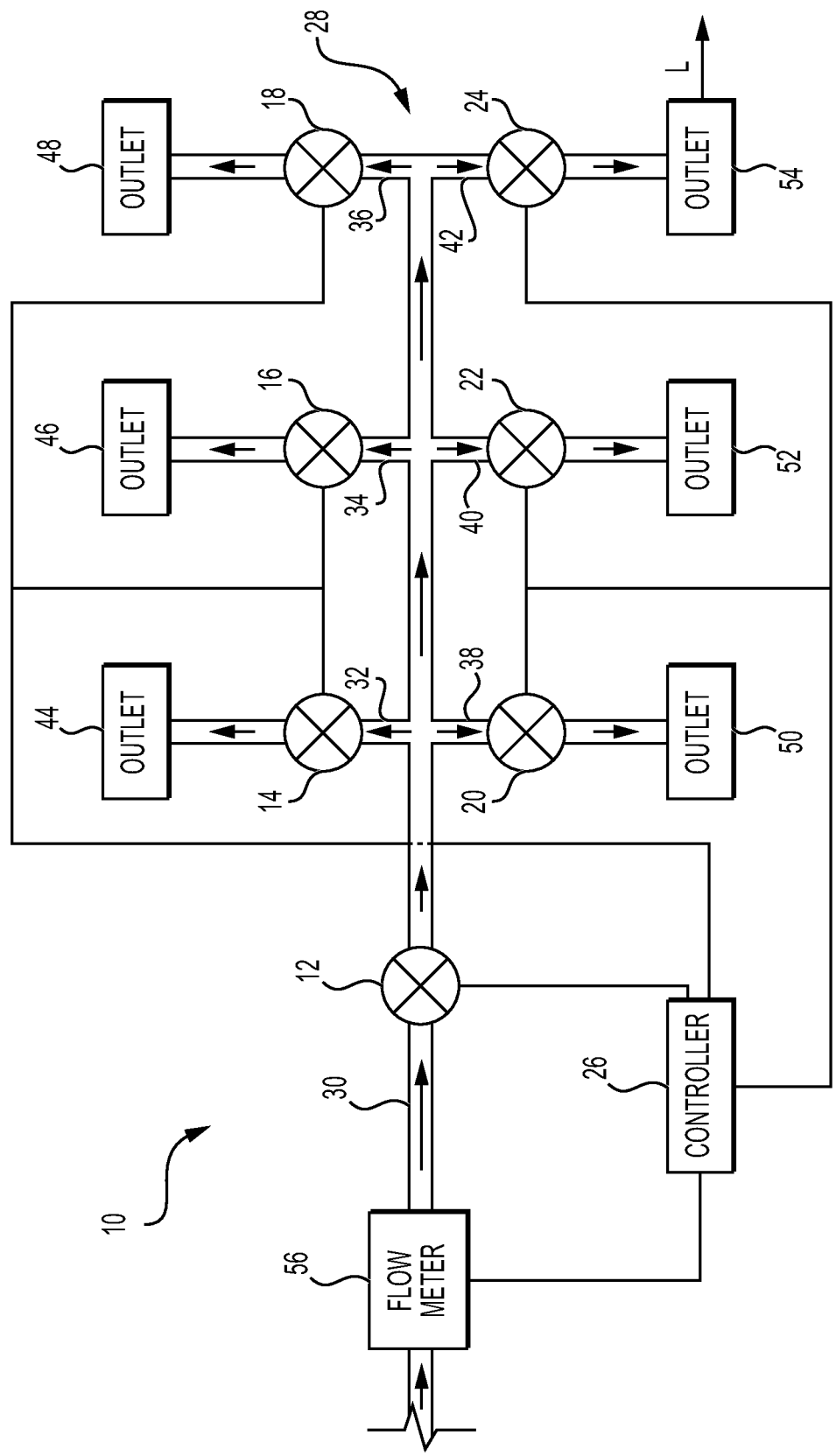
FIG. 1, FIG. 2, FIG. 3, FIG. 4, FIG. 5 and FIG. 6 diagrammatically illustrate successive steps of the method for localizing a water leak in an exemplary plumbing system.

The system and method for localizing a water leak uses the automated opening and closing of shut-off valves to localize a water leak in a plumbing system. In the non-limiting example of FIGS. 1-6, system 10 is shown as including a main shut-off valve 12 and six branch shut-off valves 14, 16, 18, 20, 22 and 24, each in communication with a controller 26. In this non-limiting example, plumbing system 28 includes a main line 30, and six branch lines 32, 34, 36, 38, 40 and 42. It should be understood that the six branch lines 32, 34, 36, 38, 40 and 42 and the corresponding six branch shut-off valves 14, 16, 18, 20, 22 and 24 are shown for exemplary purposes only and that, in general, for each branch line in a plumbing system which branches from a main line, a corresponding branch shut-off valve is provided for selectively opening and closing the branch line to water flow. Similarly, main shut-off valve 12 selectively opens and closes the main line 30 to water flow. It should be understood that main shut-off valve 12 and branch shut-off valves 14, 16, 18, 20, 22, 24 may be any suitable type of valves for selectively ceasing and resuming water flow in each of lines 12, 32, 34, 36, 38, 40, 42.

Each of the branch lines 32, 34, 36, 38, 40, 42 terminates in a corresponding water outlet 44, 46, 48, 50, 52, 54, respectively, such as a faucet, a spigot, a dispensing valve, a toilet, a water fountain or the like. A flow meter 56 is used to detect a leak in the plumbing system 28 when each of the water outlets 44, 46, 48, 50, 52, 54 is in a non-dispensing state. As a non-limiting example, if each of the branch lines 32, 34, 36, 38, 40, 42 terminates in a water faucet, then when all of the water faucets are known to be turned off, if the flow meter 56 detects water flow in the plumbing system 28, then a determination is made that a water leak exists. As shown in FIG. 1, controller 26 is in communication with flow meter 56. Thus, when controller 26 makes an initial test to determine if a water leak is present in plumbing system 28, flow meter 56 provides the necessary testing data to controller 26 in the form of either a measurement of no flow through main line 30 or flow through main line 30. In the non-limiting example of FIG. 1, a leak in branch line 42 and/or its corresponding outlet 54 is indicated as L.

Figure 2:
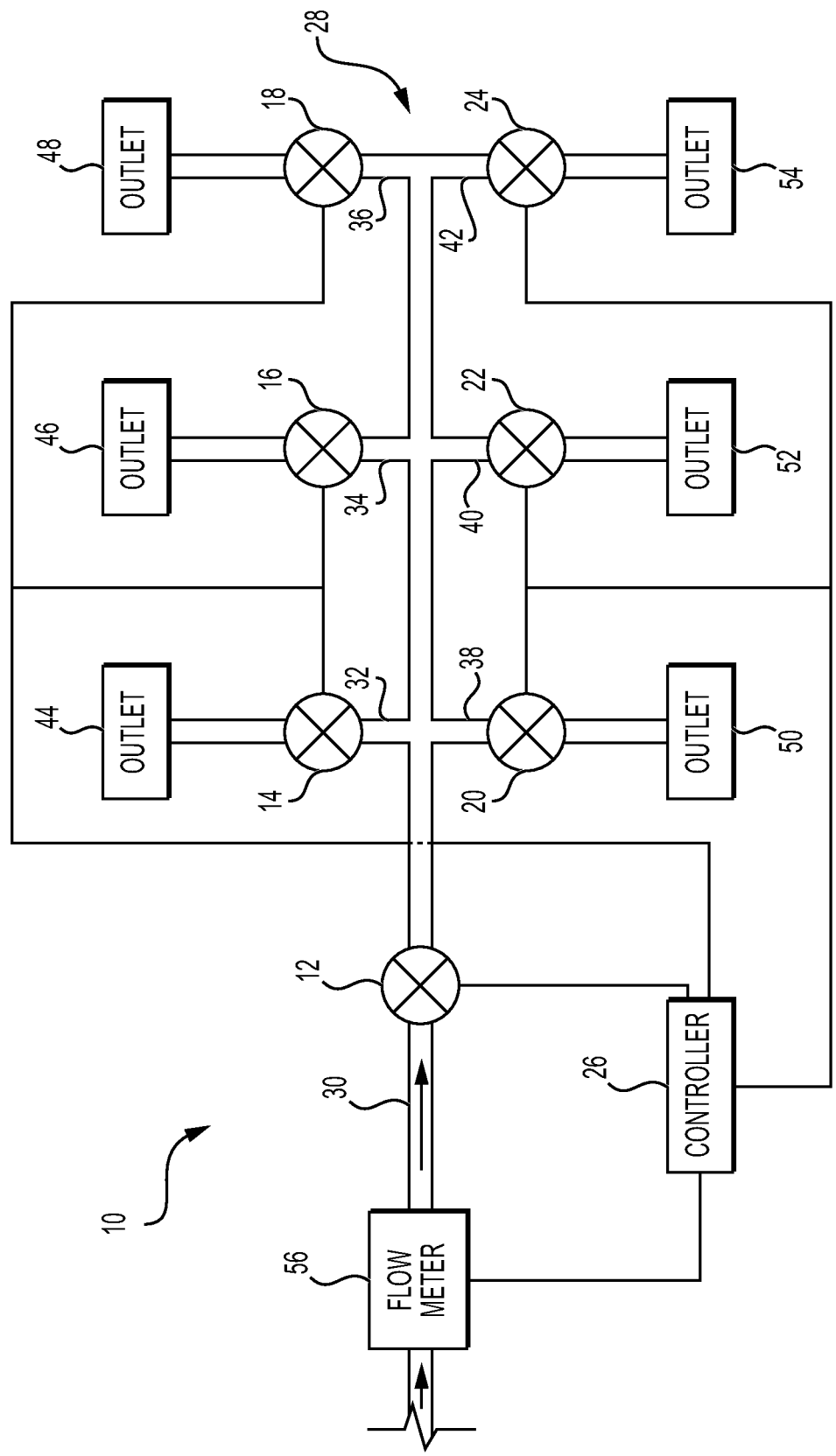
Figure 3:
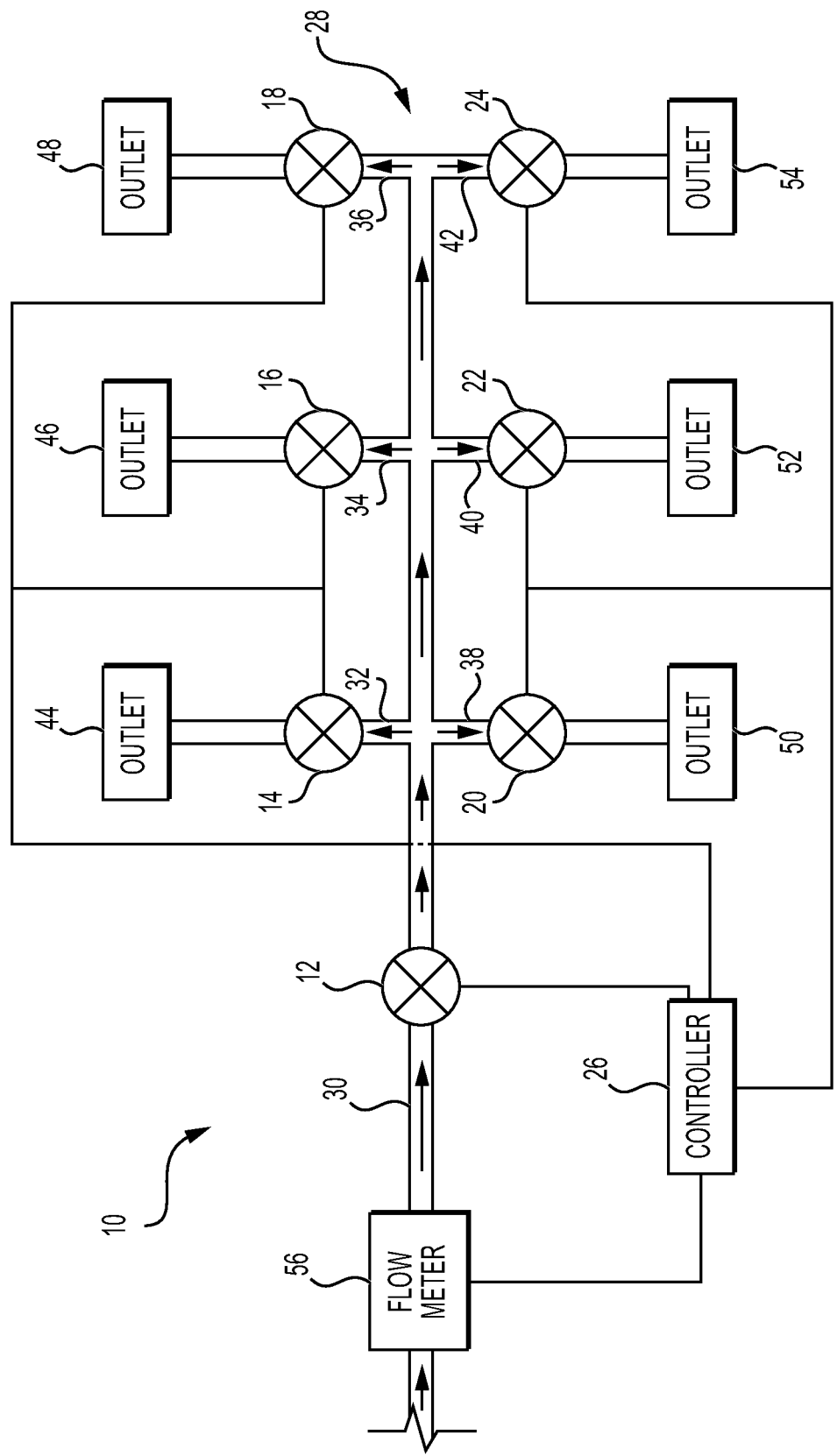
Figure 4:
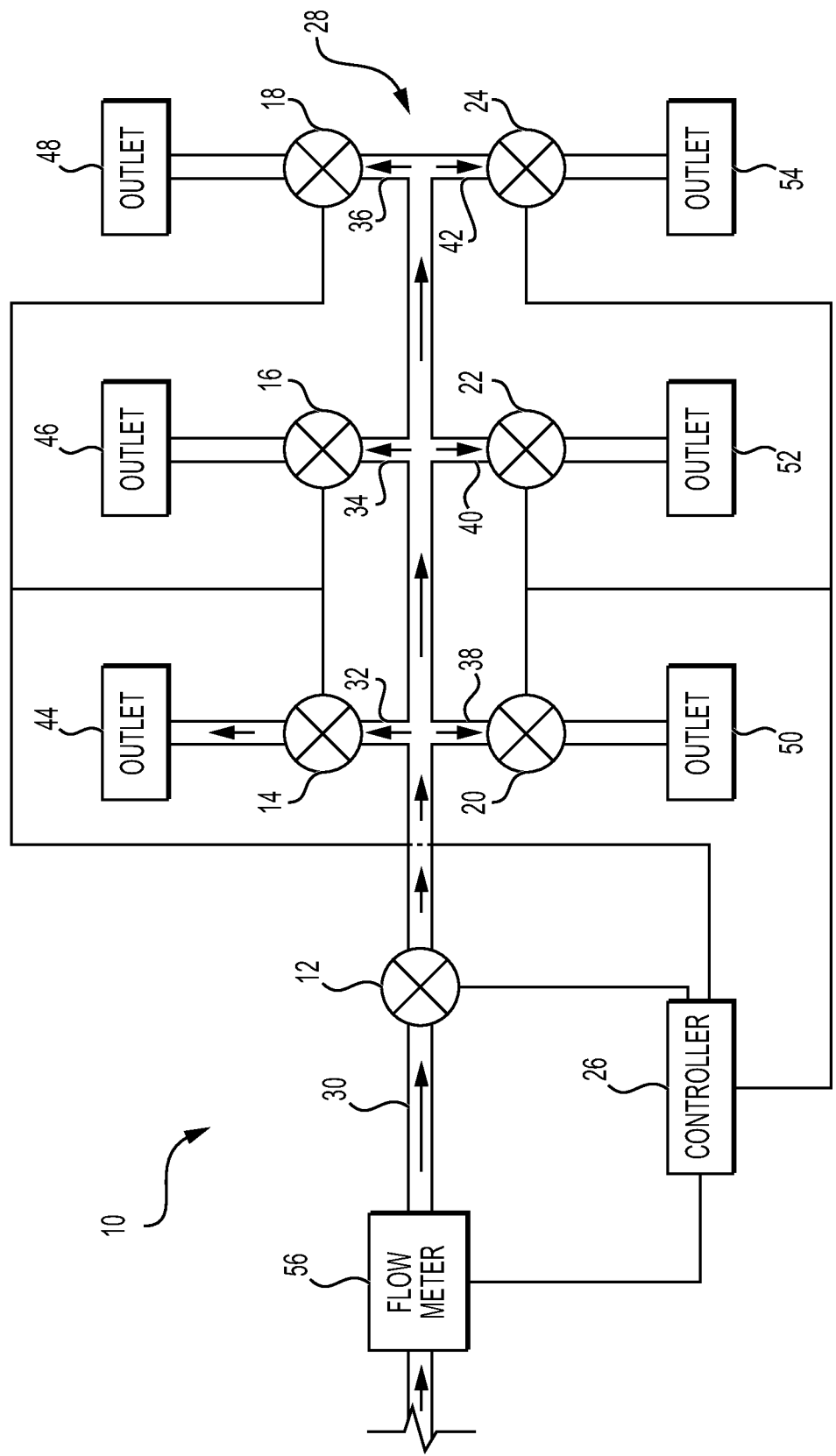

Once the flow meter 56 and controller 26 determine that the water leak L exists, the controller 26 transmits a signal to the main shut-off valve 12, which is associated with the main line 30, to close the main shut-off valve 12. Controller 26 also transmits signals to each of the branch shut-off valves 14, 16, 18, 20, 22, 24 to close. This state is shown in FIG. 2, where no water flows beyond main shut-off valve 12. Once all water has ceased to flow through plumbing system 28 beyond main shut-off valve 12, the main shut-off valve 12 is re-opened, but with the branch shut-off valves 14, 16, 18, 20, 22, 24 remaining closed. As shown in FIG. 3, the water is only free to flow through main line 30 and is blocked by each of the branch shut-off valves 14, 16, 18, 20, 22, 24. The flow meter 56 and controller 26 determine if the water is continuously flowing through the main line 30 in this configuration. If water is determined to be flowing through the main line 30, then it can be determined that the leak in the plumbing system 28 is in the main line 30. The main shut-off valve 12 can then be closed again, under the control of controller 26, so that the main line 30 can be inspected and the leak can be repaired.

If the water is determined not to be continuously flowing through the main line 30 in this configuration, then each of the branch shut-off valves 14, 16, 18, 20, 22, 24 is successively opened, under the control of controller 26. Following the opening of each of the branch shut-off valves 14, 16, 18, 20, 22, 24, it is determined if the water is continuously flowing using the flow meter 56 and controller 26. When the flow meter 56 and controller 26 determine that the water is continuously flowing directly after the opening of one of the branch shut-off valves 14, 16, 18, 20, 22, 24, then it is determined that the leak in the plumbing system 28 is in the particular branch line associated with that one of the branch shut-off valves. In the non-limiting example of FIGS. 4-6, branch shut-off valve 14 is opened in FIG. 4, while the remainder of the branch shut-off valves 16, 18, 20, 22, 24 remain closed. Main shut-off valve 12 is also open. However, since each of the water outlets, including water outlet 44 of branch line 32, remains shut off, flow meter 56 and controller 26 will determine that water is not continuously flowing in this configuration. It is noted that the same non-limiting example of FIG. 1 is used herein; i.e., the leak exists in branch line 42. At this stage, branch shut-off valve 24 is closed, thus no water flows through the leak, resulting in a measurement of no continuous water flow by flow meter 56.

Figure 5:
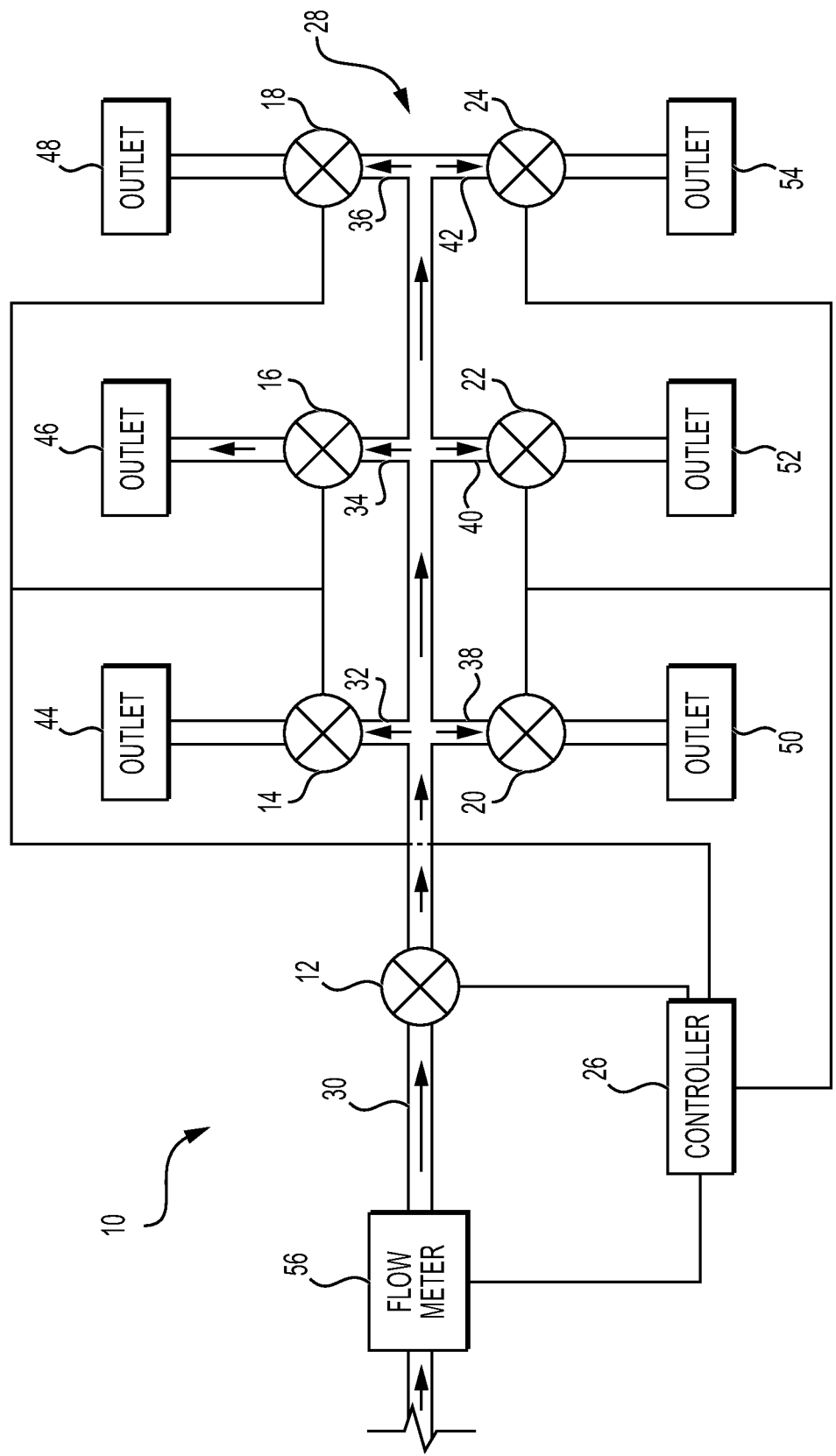

Once it is determined that there is no continuous flow of water, branch shut-off valve 14 for branch line 32 is closed and, as shown in FIG. 5, the next branch shut-off valve is opened, under the control of controller 26, while the remainder of the branch shut-off valves 14, 18, 20, 22, 24 remain closed. In the non-limiting example of FIG. 5, branch shut-off valve 16 of branch line 34 is the next branch shut-off valve in the succession to be opened. In this non-limiting example, the flow meter 56 and controller 26 will again determine that there is no continuous flow of water, and branch shut-off valve 16 will be closed, under the control of controller 26. The succession of branch shut-off valves opening and closing continues until a continuous flow of water is detected.

Figure 6:
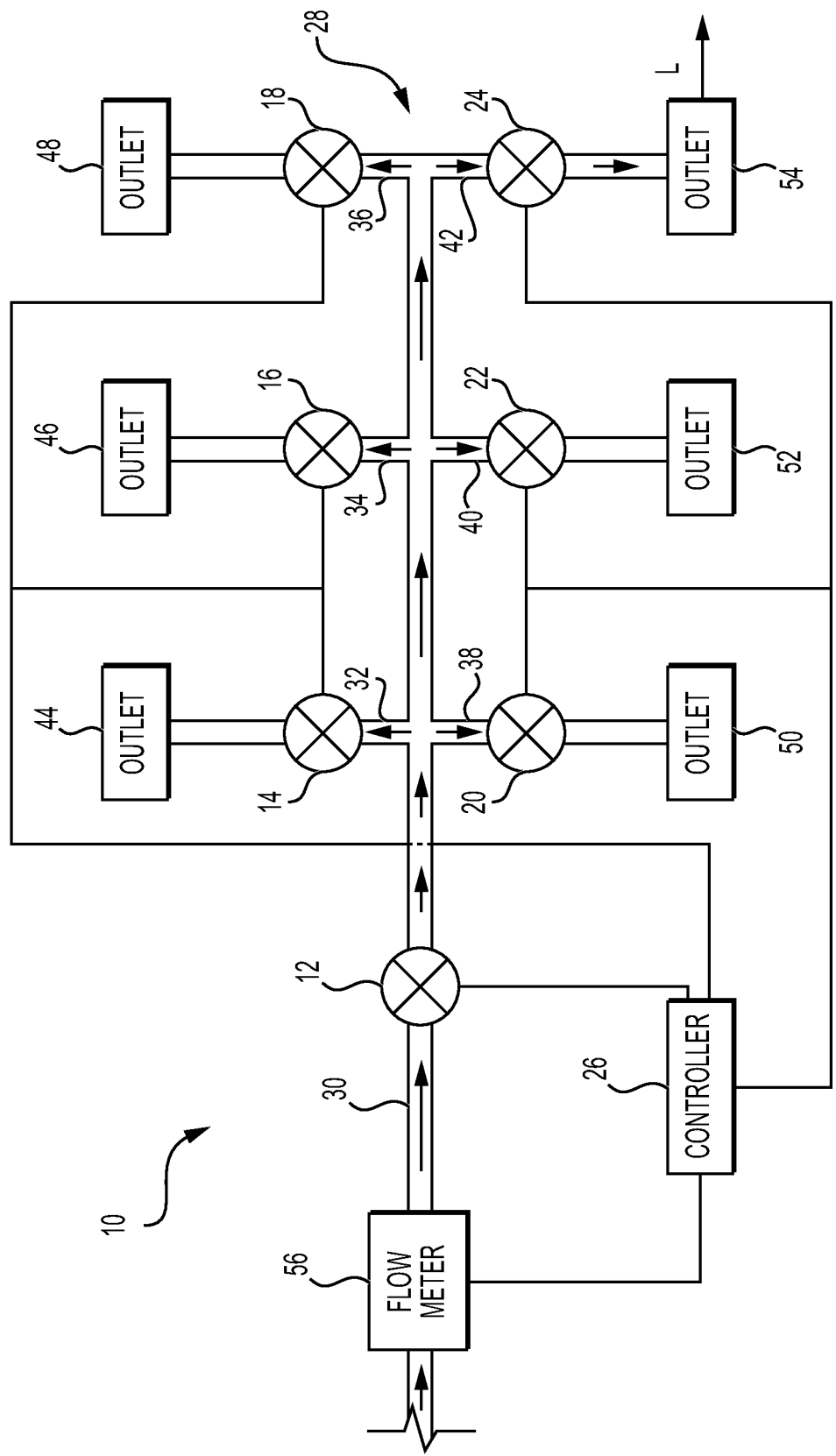

In the non-limiting example of FIG. 6, the leak L exists in branch line 42 and/or corresponding outlet 54. Thus, when branch shut-off valve 24 is opened, the flow meter 56 and controller 26 will detect a continuous flow of water and the determination will be made that the leak L is found on branch line 42. Inspection of branch line 42 and corresponding outlet 54 can then be made to implement repairs.

Directly following determination of the water leak L in branch line 42 in this non-limiting example, the branch shut-off valve 24 associated therewith may be closed again so that the opening and closing of subsequent ones of the branch shut-off valves (20 and 22 in this non-limiting example) can commence in order to detect any additional branch line leaks. The branch shut-off valve 24 will remain closed until the leak L can be repaired.

As discussed above, the opening and closing of the shut-off valves 12, 14, 16, 18, 20, 22, 24, and monitoring with the flow meter 56, may be under the operation and control of controller 26, which is in communication with each. It should be understood that the controller 26 may be, or may include, any suitable type of computer, processor, programmable logic controller or the like. Controller 26 may also include, or be in communication with, any suitable type of user interface, and may further include, or be in communication with, any suitable type of computer readable and programmable memory, such as a non-transitory, computer readable storage medium. Controller 26 may also include, or be in communication with, any suitable type of display, which may be coupled with, or may be in communication with, the user interface. Upon localization of the water leak L, an indication may be provided to the user. As a non-limiting example, the display associated with the controller 26 may give a textual, graphic or other visual indication to the user of the location of the water leak L. In the non-limiting example of FIGS. 1-6, the user will be provided with instructions and/or information indicating that the water leak is located in branch line 42.

Figure 7:
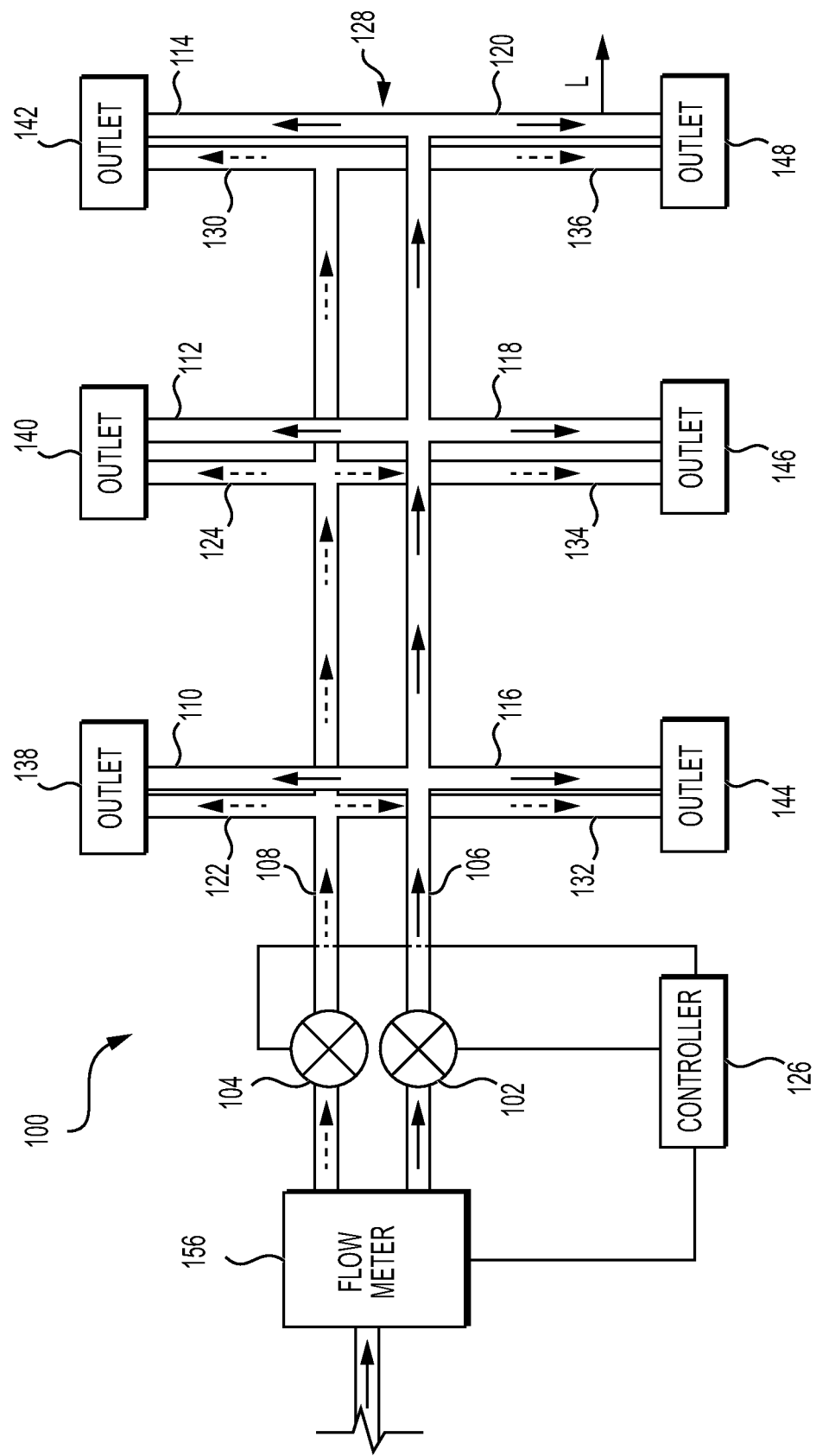
FIG. 7, FIG. 8 and FIG. 9 diagrammatically illustrate successive steps of an alternative embodiment of the method for localizing a water leak in an exemplary plumbing system.
Figure 8:
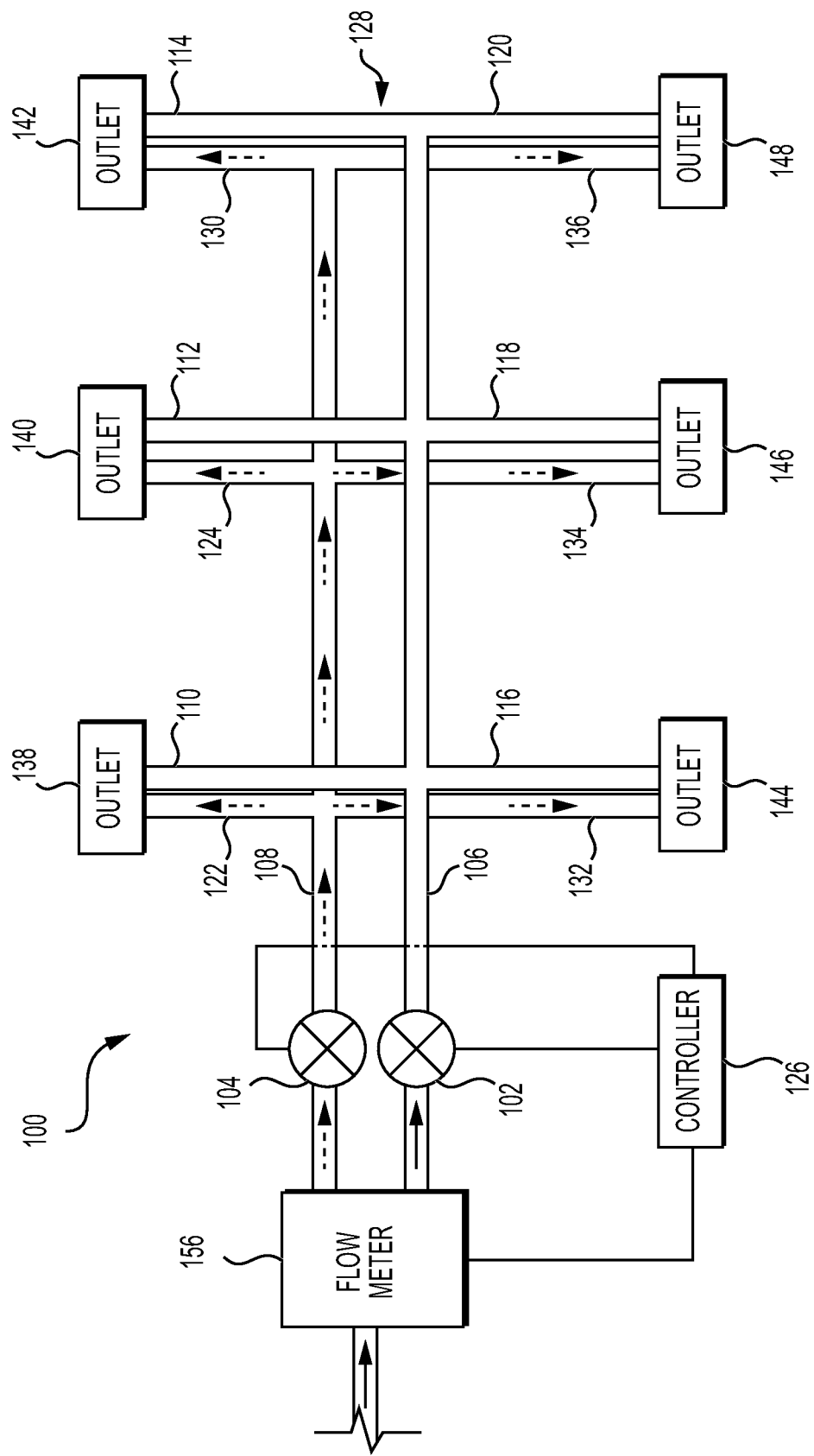
Figure 9:
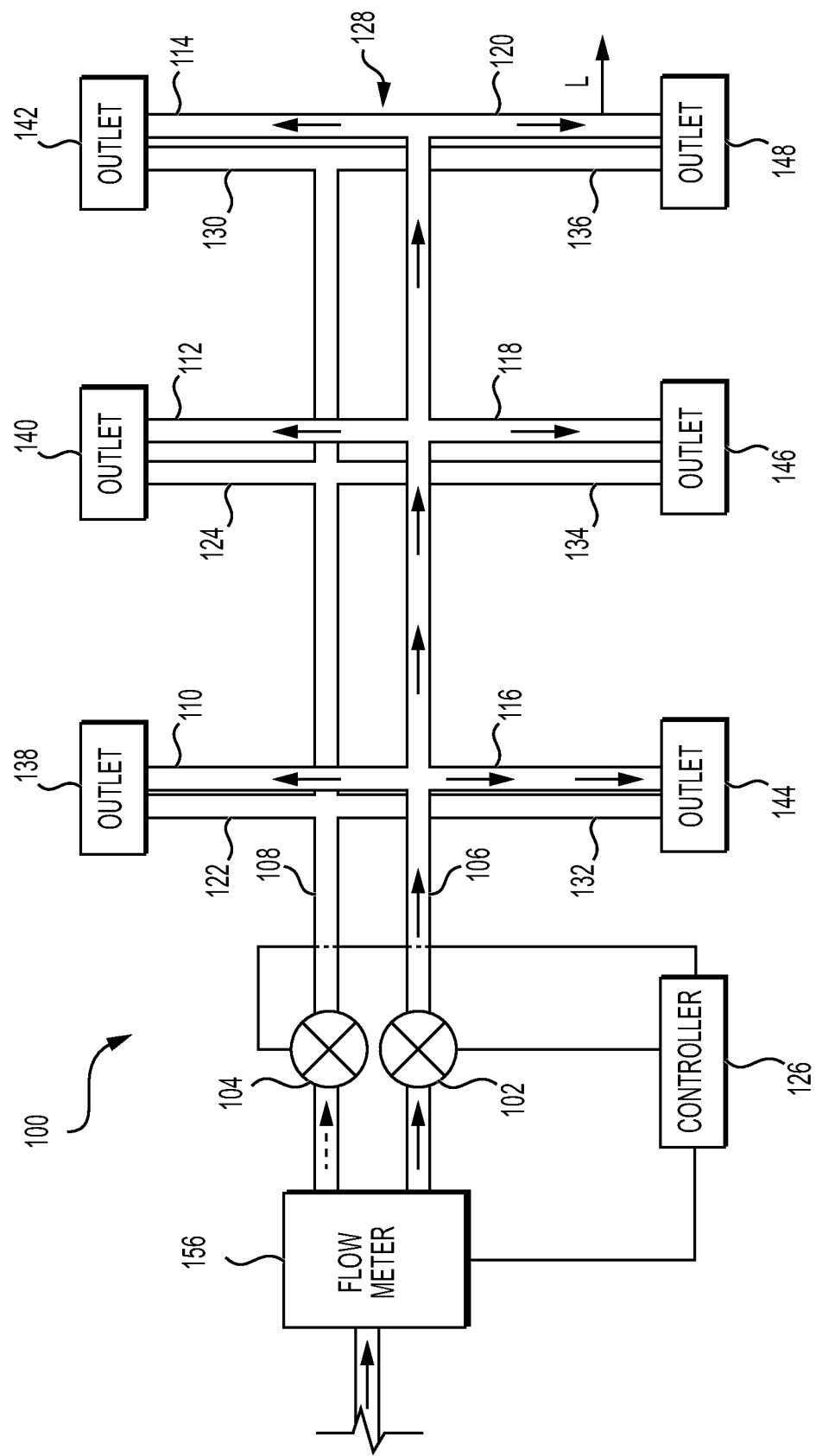

A similar technique may be used to determine if a water leak is in a hot water line or a cold water line of a plumbing system. In the alternative system 100 of FIGS. 7-9, the plumbing system 128 includes a cold main line 106 with a plurality of cold branch lines 110, 112, 114, 116, 118 and 120 in fluid communication with the cold main line 106, and a hot main line 108 with a plurality of hot branch lines 122, 124, 130, 132, 134 and 136 in fluid communication with the hot main line 108. The plumbing system 128 further includes a plurality of water outlets 138, 140, 142, 144, 146 and 148, similar to the water outlets of the previous embodiment, where each of the water outlets 138, 140, 142, 144, 146, 148 is in fluid communication with a corresponding one of the cold branch lines 110, 112, 114, 116, 118, 120 and also a corresponding one of the hot branch lines 122, 124, 130, 132, 134, 136. Although the non-limiting example of FIGS. 7-9 shows six cold branch lines and six hot branch lines, it should be understood that this configuration is shown for exemplary purposes only. As in the previous embodiment, the flow meter 156 detects a leak L in the plumbing system 128 when each of the water outlets 138, 140, 142, 144, 146, 148 is in a non-dispensing state. The flow meter 156 may be any suitable type of flow meter, as in the previous embodiment. In the non-limiting example of FIG. 7, the leak L is in the cold branch line 120.

A hot main shut-off valve 104 associated with the hot main line 108 and a cold main shut-off valve 102 associated with the cold main line 106 are both closed upon detection of the leak L. Similar to the previous embodiment, controller 126, which is similar to controller 26, is in communication with flow meter 156, the cold main shut-off valve 102, and the hot main shut-off valve 104. As shown in FIG. 8, the hot main shut-off valve 104 is then opened, and it is determined if water is continuously flowing through the hot main line 108 using the flow meter 156. In this state, each of the water outlets 138, 140, 142, 144, 146, 148 remains closed, thus a continuous flow of water would only be detected by the flow meter 156 and controller 126 if the leak was in either the hot main line 108 or one of the hot branch lines 122, 124, 130, 132, 134, 136. If water is determined to be flowing through the hot main line 108 by the flow meter 156 and controller 126, then it is determined that the leak in the plumbing system 128 is in the hot main line 108 or in one of the hot branch lines 122, 124, 130, 132, 134, 136 in communication therewith. The hot main shot-off valve 104 is then closed, and the user can then be informed that the leak has been located in the hot water line. Inspection of the hot water line can then begin for implementation of repairs. As in the previous embodiment, the hot main shut-off valve 104 will remain closed from the time that the leak is detected in the hot water line until the leak is repaired.

If the water is determined not to be continuously flowing through the hot main line 108, then the hot main shut-off valve 104 is closed and, as shown in FIG. 9, the cold main shut-off valve 102 is opened. If the water is determined to be continuously flowing through the cold main line 106 using the flow meter 156, then it is determined that the leak L in the plumbing system 128 is in the cold main line 106 or in one of the cold branch lines 110, 112, 114, 116, 118, 120 in communication therewith. It should be understood that, alternatively, the cold main line 106 may be tested first and that the above order of testing is provided as a non-limiting example only.

It is to be understood that the system and method for localizing a water leak are not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

The invention claimed is:

1. A method for localizing a water leak, comprising the steps of:
   a) detecting a leak in a plumbing system with a flow meter, wherein the plumbing system includes a main line and a plurality of branch lines in fluid communication therewith, wherein each of the branch lines terminates in a corresponding water outlet, and wherein the flow meter detects the leak in the plumbing system when each of the water outlets is in a non-dispensing state;
   b) closing a main shut-off valve associated with the main line and closing a plurality of branch shut-off valves respectively associated with the plurality of branch lines;
   c) opening the main shut-off valve;
   d) determining whether water is continuously flowing through the main line using the flow meter, and when the water is determined to be flowing through the main line, then determining that the leak in the plumbing system is in the main line;
   e) when the water is determined not to be continuously flowing through the main line in step d), then successively opening each of the branch shut-off valves and, following the opening of each of the branch shut-off valves, determining whether the water is continuously flowing using the flow meter; and
   f) when the flow meter determines that the water is continuously flowing directly after the opening of one of the branch shut-off valves, determining that the leak in the plumbing system is in one of the branch lines associated with the one of the branch shut-off valves.

2. The method for localizing a water leak as recited in claim 1, further comprising the step of closing the one of the branch shut-off valves following the determination that the leak in the plumbing system is in the one of the branch lines associated therewith.

3. A system for localizing a water leak, comprising:
   a flow meter adapted for monitoring water flow through a main line of a plumbing system, the plumbing system further having a plurality of branch lines in fluid communication with the main line, and wherein each of the branch lines terminates in a corresponding water outlet;
   a main shut-off valve associated with the main line;
   a plurality of branch shut-off valves respectively associated with the plurality of branch lines; and
   a controller in communication with the flow meter, the main shut-off valve, and each of the branch shut-off valves, the controller being configured to:
      detect a leak in the plumbing system with the flow meter when each of the water outlets is in a non-dispensing state;

close the main shut-off valve associated with the main line and close the plurality of branch shut-off valves respectively associated with the branch lines;

open the main shut-off valve;

determine whether water is continuously flowing through the main line using the flow meter, and when the water is determined to be flowing through the main line, then determining that the leak in the plumbing system is in the main line;

successively open each of the branch shut-off valves when the water is determined not to be continuously flowing through the main line, and, following the opening of each of the branch shut-off valves, determine whether the water is continuously flowing using the flow meter; and when the flow meter determines that the water is continuously flowing directly after the opening of one of the branch shut-off valves, determine that the leak in the plumbing system is in one of the branch lines associated with the one of the branch shut-off valves.

4. The system for localizing a water leak as recited in claim 3, wherein the controller is further configured to close the one of the branch shut-off valves following the determination that the leak in the plumbing system is in the one of the branch lines associated therewith.

* * * * *